May 31, 1927.
G. A. WETTENGEL
1,630,284
DEVICE FOR PREVENTING THEFT OF AUTOMOBILES IN HIGHWAYS
Filed March 2, 1925  2 Sheets-Sheet 2
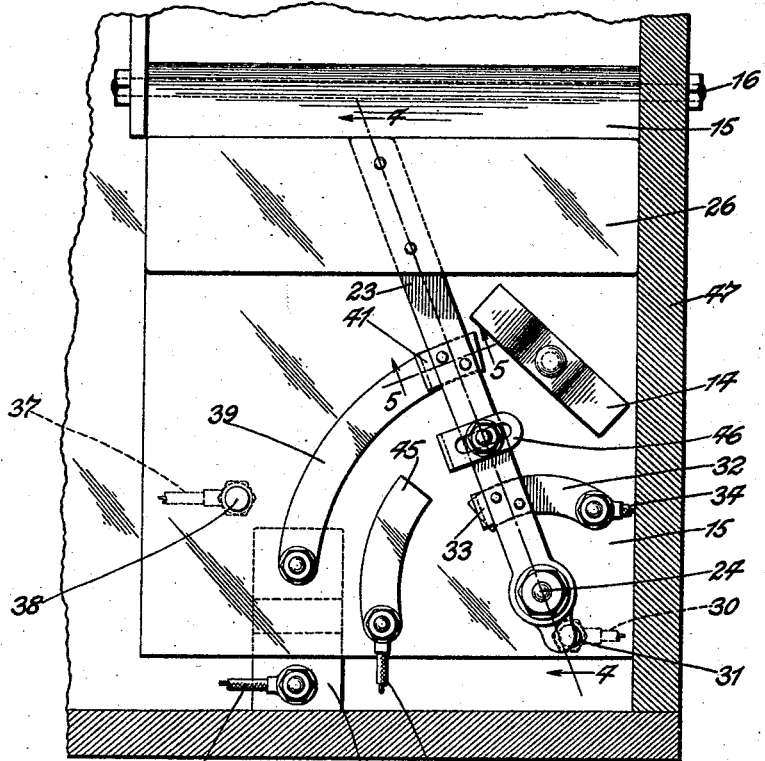
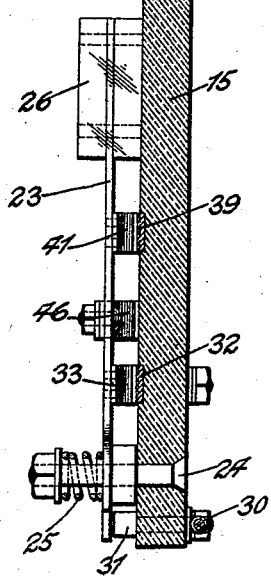
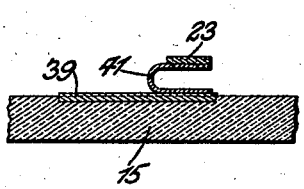
Inventor:
George A. Wettengel,
His Attorneys.

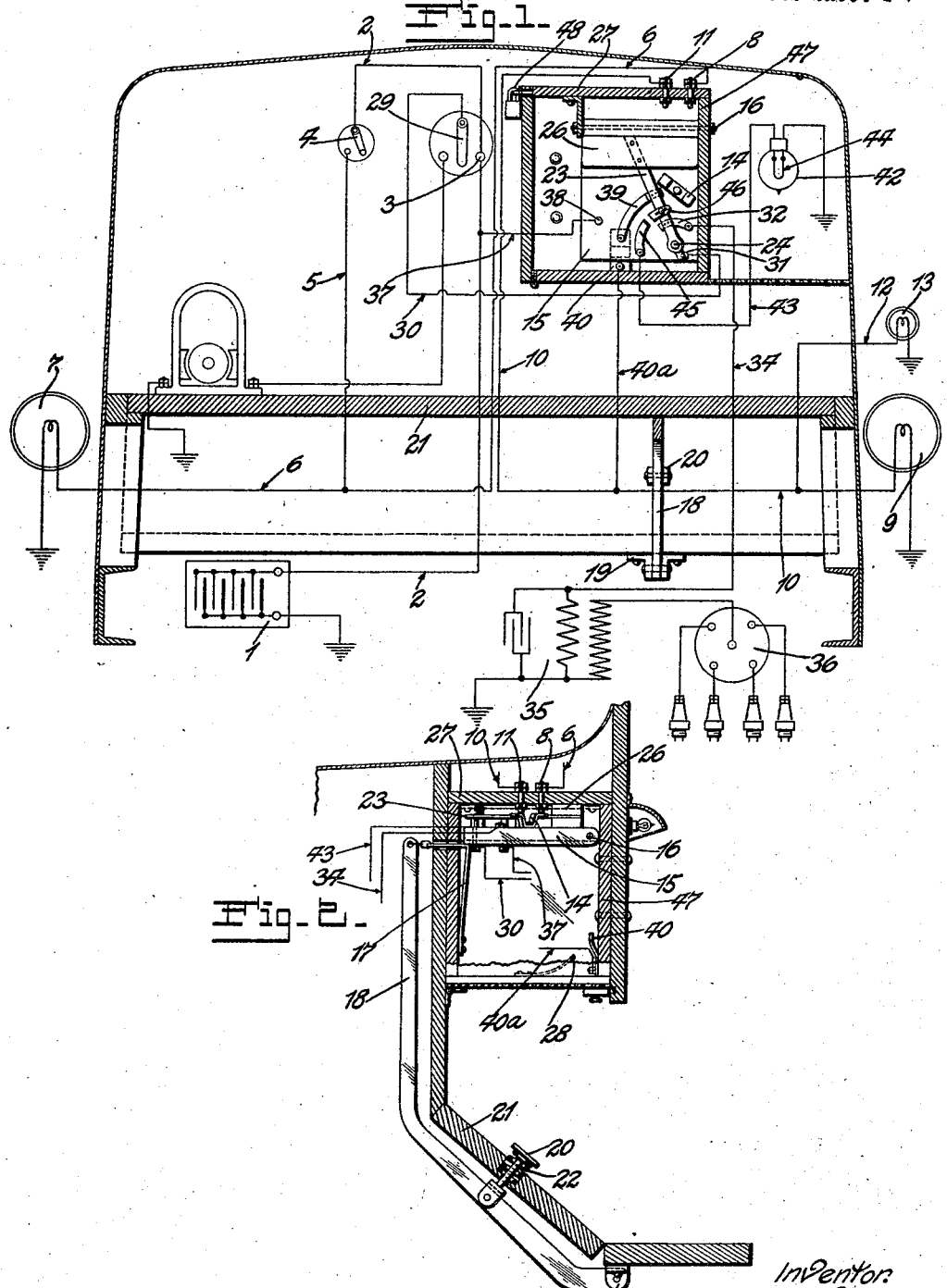

Patented May 31, 1927.

1,630,284

UNITED STATES PATENT OFFICE.

GEORGE A. WETTENGEL, OF ST. LOUIS, MISSOURI.

DEVICE FOR PREVENTING THEFT OF AUTOMOBILES IN HIGHWAYS.

Application filed March 2, 1925. Serial No. 12,595.

This invention relates to a device for preventing theft of automobiles on highways.

An object of the inventon is to provide a device for use on an automobile which may be operated by an occupant of the automobile easily and without being observed when stopped by a thief or highwayman, with the result that the motive mechanism of the automobile will be disabled ultimately and within a comparatively short time.

Another object of the invention is to provide a device for the purposes mentioned which when operated will open the ignition circuit thus disabling the automobile after it has traveled approximately a predetermined distance from the point where said device was operated for that purpose.

Another object of the invention is to provide a signalling device in connection with the automobile that will operate to give an indication that the machine has been stolen or is being driven by an unauthorized person.

Another object of the invention is to provide a device for intermittently opening and closing the ignition circuit after the device has been operated in order to interrupt the regularity of combustion in the engine cylinders and to make the engine miss firing, with the result that the speed is reduced while the automobile is travelling, and with the further result that the thief is confused by such operations.

An additional object of the invention is to provide means for discharging a gas forming substance to cause discomfiture to the thief or to overcome and render him helpless.

Other objects will appear from the following description, reference being made to the drawings in which Fig. 1 is a diagrammatic view of the invention.

Fig. 2 is a vertical longitudinal sectional view showing the device by which the different parts of the invention are controlled.

Fig. 3 is an enlarged vertical cross sectional view of the switch device for opening the ignition circuit leaving the lighting circuit closed.

Fig. 4 is a sectional view on the line 4—4 of Fig. 3.

Fig. 5 is a sectional view on the line 5—5 of Fig. 3.

The battery 1 has one side grounded as usual. A wire 2 from the other side of the battery extends from a connection with a contact member 3 to one side of a switch 4. From the other side of the switch 4 a wire 5 connects with a wire 6 leading to one of the headlights 7 and to a contact member 8. The other headlight 9 is in circuit with the wire 10 leading to a contact member 11. From the wire 10 a wire 12 leads to the tail light 13.

It is necessary to bridge the gap between the contact members 8 and 11 to complete the circuit to the headlight 9. The gap between said contact members 8 and 11 is normally bridged by a part 14 attached to an insulation support 15, as clearly shown in Fig. 2. The support 15 is mounted at one end of a pivot 16 and the opposite end of said support 15 is normally upheld by a latch 17 (Fig. 2) connected with a lever 18 pivoted on a support 19 under the floor of the automobile. A pedal device 20 is connected to the lever 18 and extends through the footboard 21 of the automobile floor and is provided with a spring 22 for upholding the lever to permit the latch 17 to retain the support 15 in its raised position in which the element 14 bridges the gap between the contact members 8 and 11 to maintain both headlights in the lighting circuit. By depression of the pedal device 20 by the foot or otherwise the latch 17 is drawn from under the support 15 which thereupon swings downwardly by gravity and carries the part 14 out of contact with the contact members 8 and 11 opening the circuit to the headlight 9 and tail light 13 and leaving the circuit to the headlight 7 closed. It is intended that the lever 18 be thus operated upon the occasion of any holdup by a highwayman. The lighting system may also be disabled on other occasions, as when the automobile is not being used. In this way a part of the lighting system may be maintained in a disabled condition when the car is out of use.

My invention also comprises means for disabling the ignition system of the automobile. An arm 23 is mounted upon a pivot 24 near the free end of the support 15 and is given frictional resistance to operation by a pressure spring 25 mounted as shown (Fig. 4). A weight 26 is attached to the free end of the arm 23 and when the support 15 is in its raised position fills the space between said support 15 and the part 27 and prevents undesirable vibration of said support.

When the support 15 drops from the latch 17 the arm 23 is in an inclined position (Figs. 1 and 3) so that the weight 26 will gradually move said arm over toward a horizontal position as an incident to vibration of the automobile in traveling. The support 15 engages a retaining spring 28 and is thereby held practically stationary in its vertical position.

The ignition switch 29 (Fig. 1) by contact with the contact member 3 closes the ignition circuit from the battery. From the switch 29 the wire 30 leads to connection with a contact member 31 on the support 15 with which the arm 23 is in permanent contact when the support 15 is in its raised position, but eventually moves out of contact therewith when the support 15 drops to vertical position. The arm 23 is normally in circuit with the contact member 32 through the medium of a brush 33 supported by said arm. A wire 34 leads from the contact member 32 through the transformer coils 35 to the distributor 36 of the ignition system. It is obvious that when the arm 23 drops to horizontal position it moves out of circuit with the contact member 32 and opens the circuit to the ignition system; and it is further apparent that oscillation of the arm 23 into and out of circuit with the contact member 32 will cause the engine to miss fire and reduce speed and eventually stop.

The invention further comprises means for re-establishing a circuit to the headlight 9 and tail light 13 which circuit is intermittently opened and closed while the engine is running, thus lighting the headlight 9 and the tail light 13 at irregular intervals, which means I will now describe.

A wire 37 leads from the wire 2 to a contact member 38 on the support 15. As the arm 23 moves downwardly toward horizontal position it oscillates or vibrates into and out of contact with a contact member 39, on the support 15, which member 39 is placed in contact with a stationary contact member 40 when the support 15 drops to vertical position. The contact member 40 is in circuit with the wire 10 through a connecting wire 40$^a$. The contact member 39 is in circuit with the arm 23 through the medium of a brush 41. Thus the headlight 9 and the tail light 13 are intermittently lighted and darkened because of the vibration of the arm 23; thus indicating that the car has been stolen or is being driven by an unauthorized person.

If desired, the device may also include means for discharging a gas forming substance to cause discomfiture to the thief or to overcome and render him helpless. In the embodiment shown (Fig. 1) such means comprises frangible container 42 containing gas forming substance which, under a sufficient degree of heat, supplied electrically or otherwise, causes the container to burst or explode and release the gas. A wire 43 leads from the heating element 44 in the container to a contact member 45 on the support 15 with which the arm 23 makes circuit on descent thereof through the medium of a brush 46. This occurs automatically and as an incident to the movement of the arm 23 to its lower horizontal position.

As shown, the circuit controlling devices other than the usual switches are enclosed within a casing 47 of which the part 27 is the cover.

A lock 48 (Fig. 1) may be employed to prevent unauthorized access to the mechanism.

From the foregoing it will be seen that my invention is a highly simplified and efficient means for disabling a stolen automobile and that the disabling devices may be operated by the owner or driver of the automobile at the time of a holdup without observation by the highwayman. Due to the resistance to movement of the arm 23 the ignition system is not disabled at once, but requires the vibration of the automobile in travel before said arm 23 will move to position to disable the ignition system and to operate the lighting system to give the signals described. Ultimately the ignition system becomes entirely disabled so that the highwayman is required to stop and probably abandon the automobile. In cases where the gas forming apparatus is used the highwayman will be rendered helpless and subjected to easy capture.

I am aware that the invention may be varied in numerous particulars without departure from the nature and principle thereof, and I do not restrict myself unessentially or otherwise than as set forth in the appended claims.

What I claim and desire to secure by Letters Patent is:—

1. In a motor vehicle, the combination with the usual ignition and lighting circuits and their respective opening and closing switches, of additional switching means arranged to be operated by the vibration of the vehicle when travelling to derange and interrupt the usual functioning of said two circuits, means normally latching said second switching means in an unoperative position, and means operable by the authorized driver for releasing said latching means in the event of a holdup with intent to take the vehicle.

2. In a motor vehicle, the combination with the usual ignition and lighting circuits and their respective opening and closing switches, of additional switching means arranged to be operated by the vibration of the vehicle when travelling to derange and interrupt the usual functioning of one of said circuits, means normally latching said second switching means in an unoperative position, and means operable by the authorized driver of the vehicle for releasing said latching means in the event of a holdup with intent to take the vehicle.

3. In a motor vehicle, the combination with the usual ignition and lighting circuits and their respective opening and closing switches, of additional switching means operative by the vibration of the vehicle when travelling to derange and interrupt the usual functioning of said ignition circuit, means normally latching said switching means in an unoperative position, and means operable by the authorized driver for releasing said latching means in the event of a holdup with intent to take the vehicle.

4. In a motor vehicle, the combination with the usual ignition and lighting circuits and their respective opening and closing switches, of a pivoted support, means normally latching said support in an unoperative position, switching means arranged to be operated by said support to derange and interrupt the usual functioning of said two circuits, and means operable by the authorized driver for releasing said latching means in the event of a holdup with intent to take the vehicle.

5. In a motor vehicle, the combination with the usual independent ignition and lighting circuits and their respective independently operative opening and closing switches, of an element mounted for oscillating movements by the vibration of the vehicle when travelling to derange and interrupt the usual functioning of said ignition circuit, switching means controlled by said element in one position thereof for maintaining said ignition circuit closed and in another position thereof for opening said ignition circuit, means normally latching said element in an unoperative position, and means operable by the authorized driver for releasing said latching means to permit oscillation of said element as aforesaid in the event of a holdup with intent to take the vehicle.

6. In a motor vehicle, the combination with the usual independent ignition and lighting circuits and their respective independently operative opening and closing switches, of an element mounted for oscillating movements by the vibration of the vehicle when travelling to derange and interrupt the usual functioning of said ignition circuit, switching means controlled by said element in one position thereof for maintaining said lighting circuit closed and in another position thereof for opening said lighting circuit, means normally latching said element in an unoperative position, and means operable by the authorized driver for releasing said latching means to permit oscillation of said element as aforesaid in the event of a holdup with intent to take the vehicle.

GEORGE A. WETTENGEL.